UNITED STATES PATENT OFFICE.

RICHARD WILLSTÄTTER, OF MUNICH, AND OTTO WOLFES AND HORST MAEDER, OF DARMSTADT, GERMANY.

TROPINONE MONOCARBOXYLIC ACID ESTERS AND PREPARATION OF THE SAME.

1,419,091.     Specification of Letters Patent.     Patented June 6, 1922.

No Drawing.     Application filed August 26, 1921. Serial No. 495,763.

*To all whom it may concern:*

Be it known that we, RICHARD WILLSTÄTTER, of Arcisstrasse 1, Munich, Germany, OTTO WOLFES, of Hoffmannstrasse 49, Darmstadt, and HORST MAEDER, of Wittmannstrasse 31, Darmstadt, Germany, citizens of the Republic of Germany, have invented certain new and useful Improvements in the Tropinone Monocarboxylic-Acid Esters and Preparation of the Same, (for which we have filed applications in Germany August 23, 1919; Holland October 14, 1920; Norway October 14, 1920; Switzerland October 14, 1920; Spain October 19, 1920; Austria October 20, 1920; Hungary October 25, 1920; Japan February 9, 1921; Sweden October 26, 1920; Denmark October 26, 1920; France October 27, 1920, Czecho-Slovakia November 3, 1920, England November 16, 1920, Italy December 15, 1920, and Belgium December 26, 1920), of which the following is a clear, full, and exact description.

The objects of this invention are tropinone mono-carboxylic acid esters, unknown products, and the process of preparing the same. In the Journal of the Chemical Society of London, vol. 111/112 (1917), page 762 et seq., a process is described by Robert Robinson for the preparation of tropinone. It consists in condensing succinic dialdehyde with salts of acetone dicarboxylic acid and with methylamine, and the products of the reaction are converted into tropinone by separation of the carboxylic or ester groups.

The transition to tropinone mono-carboxylic acid esters, which, as is known, possess considerable technical importance, meets with difficulties, when proceeding according to the process mentioned in so far as the pure preparation of mono-carboxylic acid esters, by the formation of tropinone as a by-product, is technically only with difficulty carried out.

The new and important invention has been made that, the tropinone mono-carboxylic acid esters can be obtained by starting from pure or raw acetone dicarboxylic acid esters, and condensing their salts with succinic di-aldehyde and methylamine. The condensation product yields carboxylic acid very readily and applies tropinone mono-carboxylic acid esters according to the reaction equation:

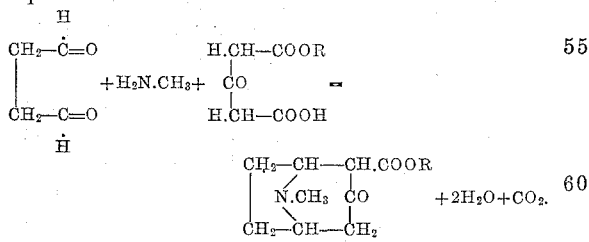

*Example 1.*—A solution of succinic di-aldehyde (approximately 10%) is made (according to Harries, Ber. d. Deutsch. Chem. Ges. 34, 1901, page 1494) and its proportional composition is determined. A quantity of the solution containing 17 parts of succinic di-aldehyde is cooled in ice-water. A (10% approximately) solution containing 40 parts of monocalcium salt of acetone di-carboxylic acid ethyl ester is added after being cooled and then 60 parts of a 33% aqueous solution of methylamine are gradually added while stirring.

The mixture is allowed to stand for 3 days at the temperature of the laboratory. Proof that the condensation has taken place can easily be obtained in the following manner: A part of the solution is boiled for one hour with an excess of dilute sulphuric acid, concentrated in vacuum, saturated with potassium hydroxyde, and distilled by steam. From the distillate the tropinone is precipitated by means of benzaldehyde (Willstätter, Ber. d. Deutsch. Chem. Ges. 30, 1897, page 734) or by means of piperonal (see Robert Robinson in the above mentioned publication).

The main mixture of the condensation solution is further worked to ecgonine esters.

The output of the tropinone mono-carboxylic acid ethyl ester amounts to about 100% of the succinic di-aldehyde employed. The ester is, in the dehydrated condition, an oil which hitherto has not been crystallized. It hardens when exposed to air and at the same time takes up water (apparently 2 molecules), and melts at 62° to 63° C. It is easily soluble in alcohol, ether, chloroform, but does not crystallize from these solvents. Whether the product is homogeneous or contains several of the theoretically possible isomers is not decided. The well crystallized picrate melts at from 133° to 135° C. The di-potassium salt of acetone di-carboxylic acid ethyl ester is described in the German Patent 300672.

*Example 2.*—1 part of acetone di-carboxylic acid (prepared according to the Pechmann, Annalen d. Chemie, 261, 1891, page 155) non-purified and still containing sulphuric acid, is dissolved by gently warming into 10 parts of alcohol containing 3% hydrochloric acid, and is kept for one week at the temperature of the laboratory. The solution is evaporated in vacuum, the residue is dissolved in ether, and calcium carbonate is slowly added while stirring, until the solution no longer affects Congo red.

The ether, which contains the ester acid and a little di-ester is then separated, and is again stirred with calcium carbonate until the ether gives a practically neutral reaction upon litmus paper. The aqueous solution now contains the calcium salt of acetone dicarboxylic acid ethyl ester and can be worked immediately according to the process of the main application.

Having thus described our invention and the manner in which the same is to be performed, what we claim and desire to secure by Letters Patent is:

1. The process of preparing tropinone mono-carboxylic acid esters by condensing salts of pure acetone di-carboxylic ester acids with succinic di-aldehyde and methylamine.

2. The process of preparing tropinone mono-carboxylic acid esters by condensing salts of raw acetone di-carboxylic ester acids with succinic di-aldehyde and methylamine.

3. The process of preparing a tropinone mono-carboxylic acid ethyl ester by condensing salt of pure acetone dicarboxylic ethyl ester acid with succinic dialdehyde and methylamine.

4. The process of preparing a tropinone mono-carboxylic acid ethyl ester by condensing salt of raw acetone dicarboxylic ethyl ester acid with succinic dialdehyde and methylamine.

In testimony whereof we have hereunto signed our names in the presence of the subscribing witnesses.

Signed at Munich, this fourteenth day of July, 1921.

RICHARD WILLSTÄTTER.

Witnesses:
 PAUL DREY,
 RICHARD LUTZ.

Signed at Frankfort-on-the-Main.
 DR. OTTO WOLFES.
 DR. HORST MAEDER.

Witnesses:
 ANNA DICK,
 BURT SEBELERS.